W. J. GALT, Jr.
GARMENT FASTENER.
APPLICATION FILED MAR. 17, 1915.
1,265,769.
Patented May 14, 1918.
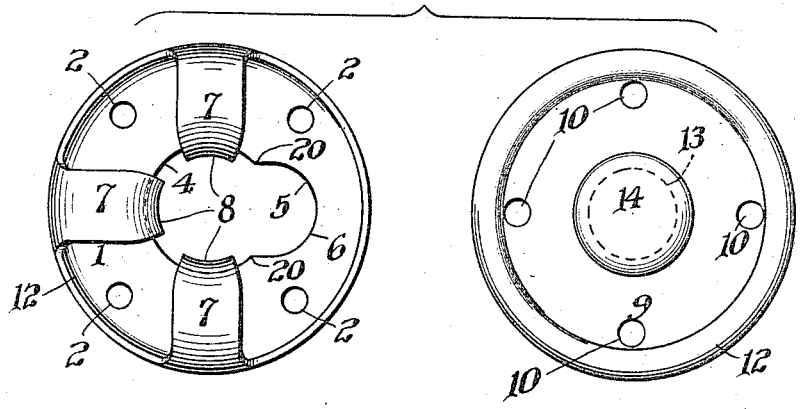
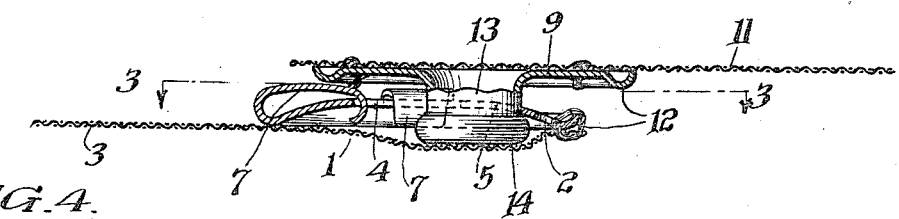
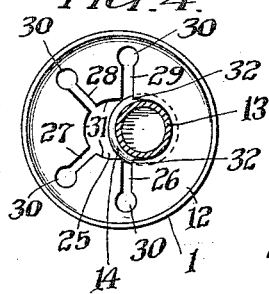
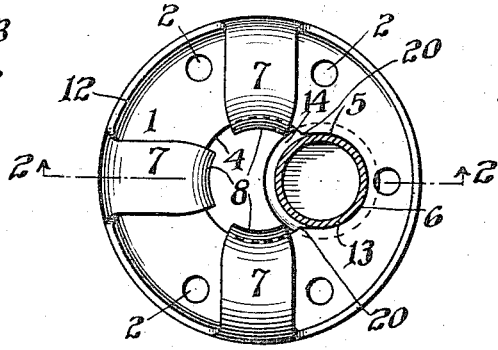
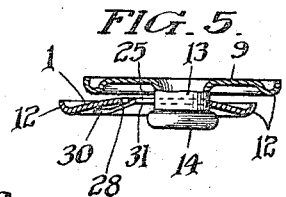
WITNESSES
Daniel Webster Jr.
Carrie E. Kleinfelder.
INVENTOR
William J. Galt Jr.
BY Cyrus N. Anderson
ATTORNEY

UNITED STATES PATENT OFFICE.

WILLIAM J. GALT, JR., OF PHILADELPHIA, PENNSYLVANIA, ASSIGNOR TO THE DE LONG HOOK AND EYE COMPANY, OF PHILADELPHIA, PENNSYLVANIA, A CORPORATION OF PENNSYLVANIA.

GARMENT-FASTENER.

1,265,769.

Specification of Letters Patent.

Patented May 14, 1918.

Application filed March 17, 1915. Serial No. 14,882.

*To all whom it may concern:*

Be it known that I, WILLIAM J. GALT, Jr., a citizen of the United States, residing in the city and county of Philadelphia, State of Pennsylvania, have invented certain new and useful Improvements in Garment-Fasteners, of which the following is a specification.

My invention relates to garment fasteners of a character combining the advantageous features of construction both of snap fasteners and hooks and eyes.

One of the objects of my invention is to provide a garment fastener including ball and socket members which are adapted to be engaged with each other in the manner of a snap fastener and which may be readily disconnected from each other or disassembled when desired. The construction, however, is such that when the parts are once assembled they will not accidentally become disengaged or disconnected from each other, but on the contrary the greater the force exerted in the general direction of the planes of the members and transversely of the ball of the ball member the more firmly and securely will the members remain in holding engagement with each other. Notwithstanding this advantageous feature of construction whereby when once assembled the strains and pulls to which the fastener may be subjected in use tend really to more securely and firmly hold the parts in engagement, they may be readily, easily and quickly disconnected and disengaged from each other when desired or as required.

In the accompanying drawings I have illustrated convenient forms of embodiment of my invention but it will be understood that changes in the details of construction may be made within the scope of the claims without departing from my said invention.

In the drawings:—

Figure 1 is a plan view of the inner sides of the ball and socket members of the device; that is, the sides which are face to face with each other when the members are in assembled or engaged relation;

Fig. 2 is a transverse sectional view of the fastener showing the parts in assembled relation, said view being taken on the line 2—2 of Fig. 3;

Fig. 3 is a sectional view taken on the line 3—3 of Fig. 2;

Fig. 4 is a view similar to Fig. 3 showing a modified construction of socket member; and Fig. 5 is a transverse sectional view of a ball member and a socket member such as shown in Fig. 4 in assembled relation.

Referring to Figs. 1 to 3 of the drawings, 1 designates the socket or female member of the fastener having thread openings 2 extending therethrough by means of which the said member may be secured to the fabric 3 of a garment in known manner. The socket member is provided with an opening comprising a circular portion 4 from which extends a slot or laterally extending opening 5 the outer end of which is circular or rounded as indicated at 6.

The said socket member 1 is also provided with spring prongs or fingers 7 which have connection with its outer edge, preferably being integral therewith. Said spring prongs or fingers extend inwardly over the inner surface of the said socket member 1, being spaced therefrom, and at their inner ends are bent as indicated at 8 around the edge of the circular portion 4 of the opening. The said spring fingers or prongs are spaced from the edge of the said circular opening 4 so as to permit the necessary slight movement of the bends 8 of the fingers or prongs 7 toward the adjacent portions of the edge of the circular portion 4 of the opening when the ball of a ball member is being inserted.

In the construction of socket member as illustrated in Figs. 1 to 3 of the drawing three spring prongs or fingers are employed but it is to be understood that my invention is not limited to a construction having any specific or particular number of spring prongs or fingers as such number may be changed as desired.

For coöperating with the socket member I have provided a ball member 9 having thread openings 10 by means of which said member may be connected with the fabric 11 of a garment by means of sewing thread in known manner. However, both the members 1 and 9 may be secured to the fabric of a garment or other article or object in any other manner or way preferred.

Both the socket and ball members of the fastener may be strengthened by providing each of them adjacent to their edges with a bend or corrugation 12, as shown, but such bend or corrugation may be omitted if preferred as my invention is not limited or restricted to a socket or ball member having corrugations or bent edges or edges otherwise strengthened.

The ball of the ball member which is adapted to enter the opening in the socket member and engage the sides thereof, as will be hereinafter described, comprises a neck portion 13 and an enlarged or head portion 14 terminating the said neck portion.

In assembling the members 1 and 9 the enlargement or head 14 of the ball is inserted through the opening 4, between the opposing bent ends 8 of the spring prongs or fingers 7 after which relative movement of the members 1 and 9 may be effected so that the ball member is positioned with respect to the socket member with the neck or throat portion 13 thereof occupying the slot or opening 5. When in such position the under side of the enlarged or head portion 14 of the ball engages the outer side of the member 1 around the edges of the slot or opening 5 as is clearly indicated in Figs. 2 and 3 of the drawings. The depth or length of the slot or opening 5 should be such that the corner portions 20 of the member 1 situated at the points where the opposite edges of the slot or opening 5 join the edges of the circular portion 4 of the opening engage the under side of the enlargement or head 14 at points beyond or inside of a transverse plane through the axis of the ball so that the pulling strains exerted upon the members in general parallel relation to the planes of the members 1 and 9 transversely of the axis of the ball will not be permitted to cause separation of the members.

In other words, a force tending to tilt the ball of the ball member out of engagement with the opening 5 in the socket member would merely cause portions of the under side of the enlarged or head portion 14 thereof to contact with the outer side of the socket member at the points 20.

It will be seen, therefore, that the construction is such that the members cannot be separated merely by a pulling action thereon in directions generally in the planes of the socket and ball members 1 and 9.

When it is desired to separate the members from each other separation may be readily and easily effected merely by causing relative movement thereof so as to center the ball of the ball member with relation to the circular opening 4 and the inner ends of the spring prongs or fingers 7 in which position the said ball may be readily withdrawn from the opening, the bent portions 8 of the fingers receding sufficiently to permit such withdrawal in the same manner as they recede when the enlarged or head portion 14 of the ball is inserted into the said opening.

By reason of the construction in which in use the neck portion 13 of the head of the ball member occupies the slot or opening 5 the inner ends of the spring fingers may be so related to each other and to the sides of the enlargement or head 14 of the ball as to offer but little resistance either to the insertion or removal of the ball through the space between the inner ends of the said prongs or fingers.

In the construction shown in Figs. 4 and 5 of the drawings, I employ a ball member 9 having a ball including a neck portion 13 and a head 14, said ball member being identical with the ball member shown in Figs. 1 to 3.

The outer edge of the socket member shown in Figs. 4 and 5 is corrugated as indicated at 12. The said socket member is provided with an oblong opening 25 into which slots 26, 27, 28 and 29 open. The outer ends of the said slots terminate in circular openings 30 which may be employed as thread openings, the thread being used for the purpose of securing the socket member of the fastener to an article of wearing apparel or other article or object. The slots 26 and 29 are opposed to each other, as indicated, and open into the oblong opening 25 at about the transverse center of the same. The slots 27 and 28 converge toward each other and are angularly related to the slots 26 and 29 forming therewith, if extended, acute angles. By so arranging the slots 27 and 28 with respect to the slots 26 and 29 relatively narrow tapered portions 31 of the body of the ball member are formed which constitute spring fingers which bend laterally to permit the insertion and withdrawal of the head of the ball member into and from the oblong opening 25 of the said socket member. After the head of the ball member has been inserted between the tapering spring portions 31 of the socket member it may be moved forwardly in the said opening into the position indicated in the Figs. 4 and 5 of the drawing. It is held in such position by reason of the engagement of the under side of the head portion with the opposing or adjacent side of the socket member surrounding the portion of the opening to the right hand side of the slots or openings 26 and 29, having reference to Fig. 4 of the drawings.

It will be seen, therefore, that when the ball and socket members are assembled and are in the relative positions indicated in Figs. 4 and 5 of the drawing the head of the ball member is prevented from tilting out of the portion of the oblong opening in which it is situated by reason of the contact of the outer side of the socket member with the head at or near the points 32 thereof. The operation in this respect is substantially the same as described in connection with the construction shown in Figs. 1 to 3 of the drawings.

It may be noted that the inner ends of the tapered spring portions 31 of the socket member are concentric with respect to each other.

It will be seen that I have provided a fastener possessing all of the advantages as to security against accidental disengagement or disconnection when once placed in engagement and in use of hooks and eyes but which may be assembled with and disconnected from each other with great readiness and facility.

I claim:—

1. A garment fastener comprising ball and socket members, the said socket member having an opening therethrough one portion of which is circular and of greater diameter than the largest diameter of the ball of the ball member and the other portion of which opening is of smaller diameter than the first-named portion to receive the neck of the ball after it has been inserted through the said first-named portion, and spring prongs or fingers which extend inwardly from the outer edge of the said socket member and around the inner edge of the portion of the said opening having the larger diameter.

2. The socket member of a garment fastener of the ball and socket type, said socket member consisting of a thin metal disk having a key-hole shaped opening therethrough for the reception of the ball of the ball member, and the said disk being provided with spring prongs or fingers which project from different points upon the edge of the said disk inwardly over the face thereof and into the larger portion of the said opening and around the edge thereof, substantially as and for the purpose described.

In testimony that I claim the foregoing as my invention I have hereunto signed my name this 16th day of March, A. D. 1915.

WILLIAM J. GALT, Jr.

In the presence of—
C. E. KLEINFELDER,
FLORENCE DEACON.